United States Patent [19]
Markfelt

[11] 3,819,157
[45] June 25, 1974

[54] MIXING APPARATUS

[75] Inventor: Reinhold S. Markfelt, Minneapolis, Minn.

[73] Assignee: Universal Oil Products Company, Des Plaines, Ill.

[22] Filed: Feb. 1, 1973

[21] Appl. No.: 328,802

[52] U.S. Cl. .................................. 259/4, 222/193
[51] Int. Cl. ......................... B01f 5/00, B01f 15/02
[58] Field of Search ................. 259/4, 18, 147, 151; 222/193, 3

[56] References Cited
UNITED STATES PATENTS

| | | | |
|---|---|---|---|
| 3,338,560 | 8/1967 | Katzer | 259/4 |
| 3,415,450 | 12/1968 | Hawk | 222/193 |
| 3,425,601 | 2/1969 | Fry | 222/193 |
| 3,489,394 | 1/1970 | Stogner | 259/4 |

*Primary Examiner*—Robert W. Jenkins
*Attorney, Agent, or Firm*—James R. Hoatson, Jr.; Barry L. Clark; William H. Page, II

[57] ABSTRACT

Improved mixing apparatus permits dry powdered material such as guar gum drilling fluid additives to be mixed with water quickly and completely and without having the powder form hard-to-eliminate gum balls. The apparatus comprises a wye fitting having a pair of inlet pipe branches or arms for receiving water and powder, respectively. The inlet branches are joined to each other at a 60° angle. At their juncture, which defines a mixing chamber, they are joined to an outlet pipe which forms the stem of the wye fitting and has a diameter greater than the diameter of the inlet branches. During operation, powder is fed through one of the inlet branches from a hopper into contact with a water stream fed into the mixing chamber by the other of the inlet branches. The powder is carried to the mixing chamber by a stream of compressed air which sucks the powder from a supply hopper by means of an eductor. The improved mixing apparatus is capable of providing complete mixing at much greater feed rates than prior art mixers.

10 Claims, 4 Drawing Figures

PATENTED JUN 25 1974  3,819,157
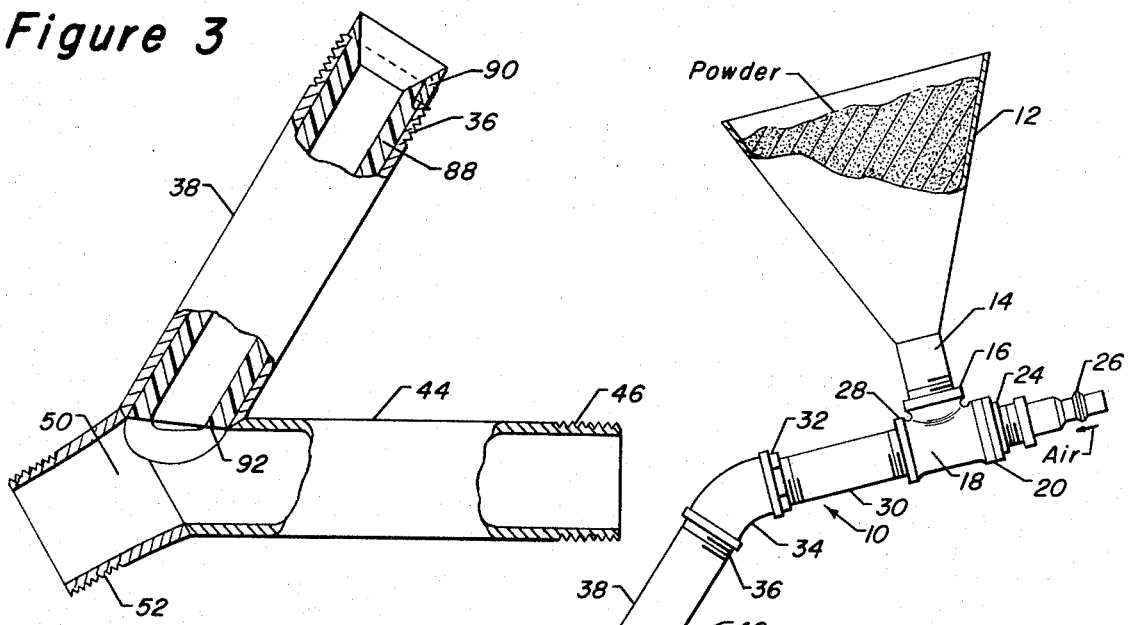
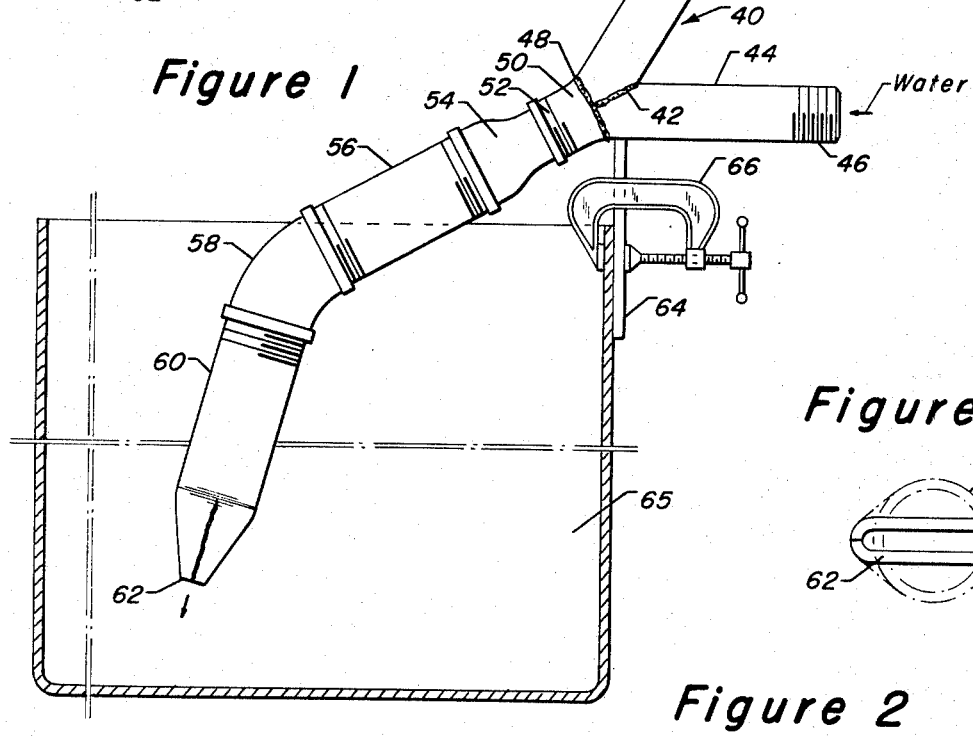
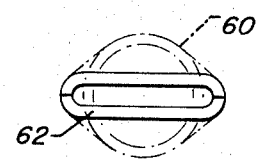
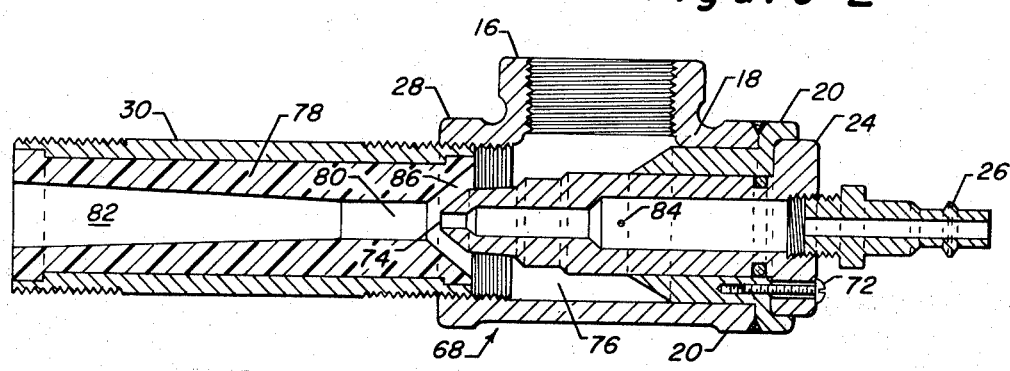

MIXING APPARATUS

BACKGROUND OF THE INVENTION

In drilling wells, it is common to employ drilling fluids which have a greater viscosity than water in order to bring the particles produced during drilling to the surface where they may be disposed of. One particularly good drilling fluid additive is guar gum, an organic substance which becomes quite viscous when mixed with water in about a 0.8 percent concentration by weight. This particular additive has the property, when mixed with water, of breaking down in viscosity through the action of enzymes after about 3½ days. This change in viscosity permits the additive to be easily removed from the well after it has served its purpose of providing sufficient time for installation of a well casing, screen, and gravel. The aforementioned additive must normally be mixed very carefully and slowly, such as by sifting it into turbulent water. Without such mixing, the additive material tends to form "gumballs" having a wetted, gelatinous surface. The "gumballs" can almost never be broken down by agitation after they are formed and are wasteful of material since the powder inside them is not active. The waste factor is of extreme importance since the guar gum additive generally costs more than five times as much per pound as bentonite, another drilling additive. When the additives are thoroughly mixed, the guar gum is less expensive since about 85–90 percent less of it is required than bentonite to achieve a given viscosity level.

Various mixing methods have been tried, such as hand stirring, mechanical agitation, and fluid eductors, with varying degrees of success. One of the better prior art mixing devices comprises an eductor in which water is brought in around the outlet of a funnel which contains the powder. However, the device is limited in utility due to its inability to provide thorough mixing at high rates of addition of guar gum powder. For example, prior art mixers are capable of mixing about 150–200 pounds of powder per hour. Although the drilling fluid is usually mixed at the beginning of a drilling job, and fluid containing 150 pounds of powder additive is adequate for many jobs, it is obvious that if the fluid can be mixed in thirty minutes rather than one hour, significant savings in equipment and labor costs are possible since the active drilling work can start and be finished more quickly.

SUMMARY

It is among the objects of the present invention to provide a mixing device for mixing powdered material into liquid which is capable of mixing such material more rapidly and at much greater feed rates than prior devices.

These and other objects are attained by the mixing device of the present invention which basically comprises an eductor assembly for providing a supply stream of dry powder and air, and a mixing assembly in which the powder-air stream is directed against a liquid stream in a mixing chamber. The eductor assembly is placed in one arm of a tee pipe fitting and connected to a supply of compressed air at its outer end. A hopper is attached to the body of the tee fitting with its large end upward for receiving powder. The other arm of the tee is connected by appropriate fittings to a wye fitting in such a manner that the branch of the wye fitting which receives the powder from the hopper and eductor assembly is positioned vertically above the inlet branch which receives the water and that it is also above the outlet stem of the wye fitting. This positioning insures that water will not wet the powder inlet pipe when the unit is properly turned off since any such wetting would cause a buildup on the walls of the inlet pipe which would reduce its flow. The inlet pipe carrying the powder is preferably lined with smooth plastic, such as nylon, acetal, polyethylene, or ABS to maintain the proper velocity of the powder/air mixture, and to prevent any disturbances in flow which would permit water to back up into the powder pipe. The small opening in the powder pipe also directs the powder against the fluid stream at a slight distance from the downstream pipe walls so that the wetted powder will have a short time to be hydrated or dissolved in the water before it contacts the pipe walls. By discharging the powder-liquid mixture from the wye fitting through an elbow and, finally, through a wide nozzle, even more thorough mixing is obtained so that, in the case of using the device to make guar gum drilling fluids, the fluid is ready to use immediately and does not have to stand in order to permit the powder to be hydrated until the fluid is at its working viscosity.

It has been found that the device works very well when the inlet branches of the wye fitting are at about a 60° angle to each other. It has also been found that the feed rates of powder addition are increased when a small amount of air is mixed with the powder in the eductor before the powder is pulled into the eductor venturi by the compressed air. The aforementioned air is preferably provided by drilling a small hole in the eductor air nozzle in the powder chamber under the hopper. It is presumed that the additional air tends to fluidize the powder so that it offers less resistance to being pulled into the main air stream.

The manner in which the mixing apparatus is operated is extremely important and quite contrary to existing "mud guns" in which the water flow is initiated before the powder is added. In the instant apparatus the air is turned on at its maximum flow rate first. To provide the fastest mixing, the water is then gradually turned on until the operator can feel a slight loss of vacuum at the bottom of the empty hopper and then the flow is reduced slightly to provide greatest vacuum. Greater water flow rates would cause the water to back up into the powder pipe and produce undesirable wetting of the surface thereof. The powder is then poured into the hopper until the amount required has been added to the water. After the powder has completely run out of the hopper and eductor, the water is turned off. Finally, the air is turned off, leaving the wye fitting clean and dry. If desired, a valve can be inserted at the bottom of the hopper to control the flow of powder. A vacuum gauge could also be added below the hopper to permit an operator to easily ascertain when the water flow is at the desired maximum without placing his hand in the hopper.

BRIEF DESCRIPTION OF THE DRAWINGS

FIG. 1 shows a side plan view of the improved mixing apparatus;

FIG. 2 shows an enlarged side sectional view of the eductor assembly shown in FIG. 1;

FIG. 3 shows an enlarged side sectional view of the wye-fitting shown in FIG. 1; and FIG. 4 shows an enlarged end view of the exit nozzle shown in FIG. 1.

DESCRIPTION OF THE PREFERRED EMBODIMENT

In FIG. 1, the improved mixing apparatus is indicated generally at 10. The apparatus 10 includes a conical-shaped hopper member 12 having an open upper end into which powder may be placed. The bottom of the hopper 12 terminates in a reduced diameter threaded exit portion 14 which is threadedly retained by the center opening of modified tee coupling member 18. The tee coupling 18 includes a first arm opening 20 into which an air nozzle assembly 24 is placed. The outer end of the air nozzle assembly 24 is engaged with an air hose coupling member 26 so that a source of compressed air can be quickly attached to the apparatus. A second arm opening 28 in the tee coupling 18 is attached to one end of a short section of pipe 30 which is threaded at its other end into a reducing bushing 32 with the reducing bushing 32, in turn, being threaded to a 45° elbow member 34. The elbow 34 is attached to threaded end portion 36 of a first inlet branch portion 38 of a wye member indicated generally at 40. The first inlet branch portion 38 is welded along weld line 42 to a second inlet branch portion 44 which terminates at an outer threaded end portion 46 which is adapted to be connected to a supply of water or other liquid under pressure. The inlet branches 38, 44 are connected along a second weld line 48 to a stem portion 50 having a larger diameter than the branch portions. The stem 50 has a threaded outlet end portion 52 which is adapted to be received by a reducing coupling member 54 which is in turn connected to a nipple section 56, a 45° elbow section 58 and an exit nozzle portion 60 having an elongated flattened oval end opening 62. A mounting bracket 64 on the mixer assembly 10 is adapted to be clamped to the side 65 of a storage tank (commonly called a mud pit) 65 by means of a clamp such as C-clamp 66. The mixer assembly is preferably held at the angle shown to insure that the powder pipe 38 will always stay clean and dry.

Referring to FIG. 2, the elements 16-30, which constitute an eductor assembly 68, are shown in cross-section. The eductor assembly 68 includes an insert sleeve 70 which is attached, such as by brazing, to the end 20 of the tee coupling 18. The air nozzle member 24 is attached to the insert sleeve 70 by means of retaining screws 72. The air nozzle 24 has a progressively smaller internal diameter from its outer end, to which the air hose coupling member 26 is attached, to its inner end which comprises an exit nozzle opening 74. Surrounding the body of the air nozzle member 24 within the tee coupling 18 is a chamber 76 which is in communication with the hopper 12 and thus adapted to receive powder to be mixed with air leaving the nozzle 74.

The nipple member 30 which extends axially outwardly from the opening 28 in the tee 18 is lined with a molded plastic insert member 78 which constitutes an expansion nozzle having a narrow entrance region 80 and a tapered larger diameter exit region 82 for receiving air from the nozzle opening 74. By providing a small opening 84 in the side wall of air nozzle 24 in communication with the chamber 76, it has been found possible to increase the amount of powder which can be fed by the eductor assembly 68 through the tapered annular exit opening 86. As previously mentioned, it appears that leakage of air through the opening 84 tends to fluidize the powder in the chamber 76 and thus decreases its natural resistance to movement through the opening 86.

After the powder-air mixture leaves the exit end 82 of the eductor assembly 68, it enters inlet branch 38 of the wye member 40. FIG. 3 shows an enlarged cross-sectional view of the interior of the wye member 40. The inlet branch pipe 38 includes a plastic insert or lining member 88 which has a key portion 90 which engages a slot in the end of the pipe so that the inner end 92 of the liner will be maintained in the correct orientation so as to smoothly blend with inlet branch 44. The liner 88 reduces the diameter of the powder flow path and also increases the velocity of the flow to promote better mixing.

FIG. 4 shows an end view of the elongated exit opening 62 of the mixer assembly 10. This shape is preferably achieved by cutting opposing slots in the end of the exit nozzle 60 and then flattening and welding together the two cut portions so as to define the shape shown in FIG. 4.

The wye member 40 shown in FIG. 3 is preferably made by taking two lengths of pipe and cutting them off at an angle of 30°, welding them together along the cut line and then cutting off the apex. The resulting composite section is then welded to a larger diameter pipe which has been flattened into an elliptical shape to match the resulting end cross-section of the inlet branches after they are cut and welded.

In actual practice, it has been found that it is possible to mix 300 or more pounds per hour of powdered guar gum into water with the apparatus shown in FIG. 1. In a prototype of the apparatus the inlet branches 38, 44 of the wye member 40 were formed of 1¼ inch nominal diameter Schedule 40 pipe and nozzle member 60 was formed of 2 inch nominal diameter Schedule 40 pipe.

I claim as my invention:

1. Apparatus for continuously feeding a supply of powdered material into a liquid stream and mixing it therewith comprising:
   powder supply means for selectively supplying a mixture of compressed gas and powdered material;
   a wye shaped mixing device comprising a pair of hollow inlet branch portions arranged at an angle of less than 90° to each other and a hollow outlet stem portion, said inlet arm portions each having a smaller cross-sectional area than said outlet portion, said inlet and outlet portions being blended together to define a smooth-walled mixing chamber, said powder supply means being connected to one of said pair of inlet branch portions and the other of said pair of inlet portions being adapted to be connected to a source of liquid.

2. The apparatus of claim 1 wherein said pair of hollow inlet branch portions are arranged at an angle of about 60° to each other.

3. The apparatus of claim 1 wherein said powder supply means comprises an eductor assembly including a gas nozzle, a powder chamber surrounding said gas nozzle, and an expansion nozzle downstream from said gas nozzle, said nozzles cooperating to cause powder in said powder chamber to be continuously drawn into said expansion nozzle by the flow of gas through said nozzles.

4. The apparatus of claim 3 wherein said powder supply means further comprises a hopper for receiving batches of powder, said hopper being connected to said powder chamber.

5. The apparatus of claim 4 wherein said gas nozzle has a small aperture in its side wall which permits a small amount of gas to be leaked into said powder chamber upstream of the outlet opening of said gas nozzle.

6. The apparatus of claim 4 wherein said one inlet branch portion which is connected to said powder supply means is connected to the remainder of said apparatus such that liquid flowing through said other of said inlet branch portions during operation of the apparatus will not wet the inside of said one inlet branch portion.

7. The apparatus of claim 1 wherein the discharge from said wye shaped mixing device leaves said apparatus through an outlet nozzle having a generally elongated oval shape.

8. The apparatus of claim 1 wherein the said one inlet branch portion which is connected to said powder supply means has an internal diameter which is less than the internal diameter of the other inlet branch portion.

9. The apparatus of claim 8 wherein said one inlet branch portion is lined with a plastic material.

10. The apparatus of claim 1 wherein said wye shaped mixing device is fabricated from cut and welded sections of pipe with said stem portion being of larger initial diameter than said branch portions.

* * * * *